(12) United States Patent
Jang et al.

(10) Patent No.: US 12,407,927 B2
(45) Date of Patent: Sep. 2, 2025

(54) SENSOR SHIFTING MODULE AND CAMERA MODULE HAVING THE SAME

(71) Applicant: Samsung Electro-Mechanics Co., Ltd., Suwon-si (KR)

(72) Inventors: Su Bong Jang, Suwon-si (KR); Sang Jong Lee, Suwon-si (KR); Hee Soo Yoon, Suwon-si (KR); Tae Ho Yun, Suwon-si (KR); Seung Jae Song, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 220 days.

(21) Appl. No.: 17/961,859

(22) Filed: Oct. 7, 2022

(65) Prior Publication Data
US 2023/0156333 A1  May 18, 2023

(30) Foreign Application Priority Data
Nov. 15, 2021  (KR) ........................ 10-2021-0156825

(51) Int. Cl.
*H04N 5/335* (2011.01)
*H01F 7/08* (2006.01)
(Continued)

(52) U.S. Cl.
CPC ............ *H04N 23/687* (2023.01); *H01F 7/08* (2013.01); *H04N 23/54* (2023.01)

(58) Field of Classification Search
CPC ..................................................... H01F 7/08
See application file for complete search history.

(56) References Cited

U.S. PATENT DOCUMENTS

| 8,279,293 B2 * | 10/2012 | Noto | H04N 23/68 348/208.7 |
| 8,908,086 B2 * | 12/2014 | Kawai | G03B 5/08 348/208.99 |

(Continued)

FOREIGN PATENT DOCUMENTS

| CN | 102749697 A | 10/2012 |
| CN | 107615160 A | 1/2018 |

(Continued)

OTHER PUBLICATIONS

Korean Office Action Issued on Feb. 3, 2023, in Counterpart Korean Patent Application No. 10-2021-0156825 (7 Pages in English, 5 Pages in Korean).

(Continued)

*Primary Examiner* — Gary C Vieaux
(74) *Attorney, Agent, or Firm* — NSIP Law

(57) ABSTRACT

A sensor shifting module is provided. The module includes a fixed body, a movable body movably disposed inside the fixed body and including an image sensor having an imaging plane oriented in a first direction, and a driving unit moving the movable body in a direction, perpendicular to the first direction, with respect to the fixed body, and rotating the movable body about an axis parallel to the first direction. The driving unit includes a driving coil coupled to one of the fixed body and the movable body, and a driving yoke coupled to the other of the fixed body and the movable body, the driving yoke faces the driving coil in a direction perpendicular to the first direction. When a current is applied to the driving coil, the movable body moves in a direction perpendicular to the first direction, or rotates about an axis parallel to the first direction.

19 Claims, 15 Drawing Sheets

(51) Int. Cl.
*H04N 23/54* (2023.01)
*H04N 23/68* (2023.01)

(56) References Cited

U.S. PATENT DOCUMENTS

| | | | |
|---|---|---|---|
| 9,288,394 B2* | 3/2016 | Yazawa | H04N 23/682 |
| 10,197,887 B2 | 2/2019 | Enta | |
| 10,863,094 B2 | 12/2020 | Sharma et al. | |
| 11,128,788 B2 | 9/2021 | Wade | |
| 11,163,212 B2* | 11/2021 | Fu | G02B 27/646 |
| 2007/0297780 A1* | 12/2007 | Enomoto | G03B 5/02 |
| | | | 348/E5.025 |
| 2010/0202766 A1 | 8/2010 | Takizawa et al. | |
| 2011/0097061 A1* | 4/2011 | Lee | H04N 23/54 |
| | | | 396/55 |
| 2012/0268642 A1 | 10/2012 | Kawai | |
| 2017/0155847 A1* | 6/2017 | Ito | F16M 13/022 |
| 2018/0173080 A1* | 6/2018 | Enta | H04N 23/57 |
| 2019/0020822 A1* | 1/2019 | Sharma | G03B 3/10 |
| 2019/0104239 A1 | 4/2019 | Aschwanden et al. | |
| 2020/0120242 A1* | 4/2020 | Wade | G02B 7/02 |
| 2020/0218082 A1 | 7/2020 | Choi et al. | |
| 2020/0314338 A1 | 10/2020 | Johnson et al. | |
| 2021/0271049 A1 | 9/2021 | Seo et al. | |
| 2022/0094853 A1* | 3/2022 | Xu | H04N 23/55 |
| 2022/0191359 A1* | 6/2022 | Oh | H04N 23/55 |
| 2023/0353858 A1* | 11/2023 | Oh | H04N 23/58 |

FOREIGN PATENT DOCUMENTS

| | | |
|---|---|---|
| CN | 111045278 A | 4/2020 |
| CN | 210381098 U | 4/2020 |
| CN | 112702534 A | 4/2021 |
| CN | 112799203 A | 5/2021 |
| CN | 113325652 A | 8/2021 |
| JP | 5453220 B2 | 3/2014 |
| KR | 10-1567107 B1 | 11/2015 |
| KR | 10-2018-0118720 A | 10/2018 |
| KR | 10-2020-0086482 A | 7/2020 |

OTHER PUBLICATIONS

Chinese Office Action issued on Feb. 26, 2025, in corresponding Chinese Patent Application No. 202211369021.1. (9pages in English, 19pages in Chinese).

Chinese Office Action issued on Jun. 26, 2025, in counterpart Chinese Patent Application No. 202211369021.1(8 pages in English, 14 pages in Chinese).

* cited by examiner

SENSOR SHIFTING MODULE AND CAMERA MODULE HAVING THE SAME

CROSS-REFERENCE TO RELATED APPLICATIONS

This application claims the benefit under 35 USC § 119(a) of Korean Patent Application No. 10-2021-0156825, filed on Nov. 15, 2021, in the Korean Intellectual Property Office, the entire disclosure of which is incorporated herein by reference for all purposes.

BACKGROUND

1. Field

The following description relates to a sensor shifting module and camera module having the sensor shifting module.

2. Description of Related Art

With the development of communications technology, mobile devices such as, but not limited to, smartphones, are widely distributed, and accordingly, the demand for increased functions of the cameras in such mobile devices are gradually increasing. For example, a camera included in a mobile device may be manufactured to provide advanced image capturing functions (e.g., an autofocusing function, an anti-shake function, and the like) implemented in a typical digital single-lens reflex (DSLR) camera despite the small size thereof.

The optical image stabilization (OIS) function, for example, the hand shake correction function, is a function that prevents image blurring from occurring when the camera is shaken during the exposure time, and is necessary when images are captured in low-light environments in which there is a lot of shaking and the exposure time is long. Image stabilization is largely divided into Digital image stabilization (DIS), Electronic IS (EIS), and Optical IS (OIS). There-among, OIS (Optical IS) fundamentally blocks image deterioration caused by shaking by moving the lens or image sensor in a direction perpendicular to the optical axis to correct the optical path. Since a mechanical actuator is necessary, the implementation of the device is complicated and provides a best compensation performance at the cost of high price.

Since the lens barrel contains an internal optical system, a relatively large amount of force may be necessary to drive the lens barrel. Since the image sensor is relatively light, it is advantageous to implement an excellent image stabilization function even with a small force. However, when the actuator that drives the image sensor includes a permanent magnet, the magnetic field caused by the permanent magnet affects the surrounding electronic components. Specifically, when the mobile device includes multiple cameras disposed adjacently to each other, a permanent magnet inside one camera may negatively affect the operation of a neighboring camera. Therefore, cameras may not be located close to each other, or it may be difficult to dispose electronic components inside the camera.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a sensor shifting module includes a fixed body; a movable body, movably disposed inside the fixed body, and comprising an image sensor having an imaging plane oriented in a first direction; and a driving unit, configured to move the movable body in a direction, perpendicular to a first direction, with respect to the fixed body, and configured to rotate the movable body about an axis parallel to the first direction, wherein the driving unit includes a driving coil coupled to one of the fixed body and the movable body, and a driving yoke coupled to the other one of the fixed body and the movable body, wherein the driving yoke faces the driving coil in a direction perpendicular to the first direction, and wherein, when a current is applied to the driving coil, the movable body is configured to move in a direction perpendicular to the first direction by an electromagnetic interaction between the driving coil and the driving yoke, or is configured to rotate about an axis parallel to the first direction.

The movable body may have four side surfaces which form a quadrangle, and the driving coil or the driving coil is disposed adjacent to both ends of the four side surfaces.

The driving unit may include a first unit driving part, a second unit driving part, a third unit driving part and a fourth unit driving part, each comprising a driving coil and a driving yoke that are configured to move each of the first unit driving part, the second unit driving part, the third unit driving part and the fourth unit driving part in a second direction, perpendicular to the first direction, and respectively face the second direction, and wherein the first unit driving part and the second unit driving part may be spaced apart from each other on a first side surface of the movable body, and the third unit driving part and the fourth unit driving part are spaced apart from each other on a second side surface of the movable body, the first side and the second side disposed in opposite directions to each other.

The image sensor may be disposed between the first unit driving part and the second unit driving part when viewed in the second direction.

The first unit driving part and the third unit driving part may be arranged in the second direction, and the second unit driving part and the fourth unit driving part are arranged in the second direction.

The movable body may include a first side surface and a third side surface that extend in different directions from a corner of the movable body, and the driving unit may include a first unit driving part and a fifth unit driving part disposed adjacent to a corner on the first side surface and the third side surface, respectively, wherein the first unit driving part may include a driving coil and a driving yoke opposed in a second direction, perpendicular to the first direction, and the fifth unit driving part may include a driving coil and a driving yoke opposed in a third direction, perpendicular to the first direction, the second direction and the third direction intersecting each other.

A surface of the driving yoke, opposite to the driving coil, may be convex.

A surface of the driving yoke, opposite to the driving coil, may include an inclined surface that extends from a central portion of the driving yoke to ends of the driving yoke.

The driving yoke and the driving coil may be opposite to each other in a second direction, perpendicular to the first direction, and a distance in the second direction from a central portion of the driving yoke to the driving coil may be shorter than a distance in the second direction from a first end and a second end of the driving yoke to the driving coil.

The driving yoke may be a soft magnetic material.

The driving unit may further include a first yoke disposed on a first side of the driving coil, wherein the driving coil is disposed between the driving yoke and the first yoke.

The module may further include a substrate that mechanically connects the movable body to the fixed body, and is configured to deform based on a movement of the movable body with respect to the fixed body.

The substrate may include electric traces electrically connected to the image sensor.

The substrate may include a floating part fixedly coupled to the movable body, a fixed part fixedly coupled to the fixed body, and a support part that interconnects the floating part and the fixed part, wherein the support part comprises a plurality of bridges that embed the electric traces therein.

The support part may include a guide disposed between the floating part and the fixed part, and may be connected to the floating part and the fixed part through the plurality of bridges.

The plurality of bridges may include first bridges that extend in a second direction, perpendicular to the first direction, from the floating part to the guide, and second bridges which extend from the guide to the fixed part in a third direction, perpendicular to the first direction, the second direction and the third direction intersecting each other.

The driving unit may include a position sensor disposed on one of the fixed body and the movable body, and a sensing magnet disposed on the other one of the fixed body and the movable body and facing the position sensor in the first direction.

In a general aspect, a camera module includes a lens module including at least one lens; and a sensor shifting module, wherein the sensor shifting module includes a fixed body; a movable body movably disposed inside the fixed body, and including an image sensor oriented in a first direction; a substrate that mechanically connects the movable body to the fixed body, and is configured to deform based on a movement of the movable body with respect to the fixed body; and a driving unit configured to move the movable body in a direction, perpendicular to the first direction, with respect to the fixed body, and rotate the movable body about an axis parallel to the first direction, wherein the driving unit comprises a driving coil coupled to one of the fixed body and the movable body, and a driving yoke coupled to the other one of the fixed body and the movable body, and wherein the driving yoke faces the driving coil in a direction, perpendicular to the first direction, and a space between the driving yoke and the driving coil is an air gap.

The driving yoke may be a soft magnetic material.

The driving unit may include a first unit driving part, a second unit driving part, a third unit driving part and a fourth unit driving part, each comprising a driving coil and a driving yoke that are configured to move each of the first unit driving part, the second unit driving part, the third unit driving part, and the fourth unit driving part in a second direction, perpendicular to the first direction, and respectively facing the second direction, wherein the first unit driving part and the second unit driving part are spaced apart from each other on a first side surface of the movable body, and the third unit driving part and the fourth unit driving part are spaced apart from each other on a second side surface of the movable body, the first side surface and the second side surface being in opposite directions to each other.

In a general aspect, an electronic apparatus includes a housing, a camera module disposed in the housing, the camera module including a movable sensor carrier disposed on a flexible substrate; a plurality of actuator unit driving parts configured to move the movable sensor carrier in a first direction perpendicular to an optical axis direction, a second direction perpendicular to the optical axis direction, and further configured to rotate the movable sensor carrier with respect to a fixed body in a direction parallel to the optical axis direction; wherein the flexible substrate comprises a floating part on which the movable sensor carrier is disposed, a fixed part that is fixed to the fixed body, and a support part that connects the floating part to the fixed part.

Two actuator unit driving parts may be disposed on each of four sides of the movable sensor carrier.

The floating part may be configured to move relative to the fixed body.

The apparatus may further include a position sensor disposed on a base portion of the fixed body, and configured to measure the movement of the moveable sensor carrier in the first direction and the second direction, and measure an amount of rotation of the movable sensor carrier. The apparatus may further include a sensing magnet, disposed on the floating part, and disposed to face the position sensor.

The position sensor may be one of a Hall sensor and a magnetoresistance sensor.

Other features and aspects will be apparent from the following detailed description, the drawings, and the claims

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
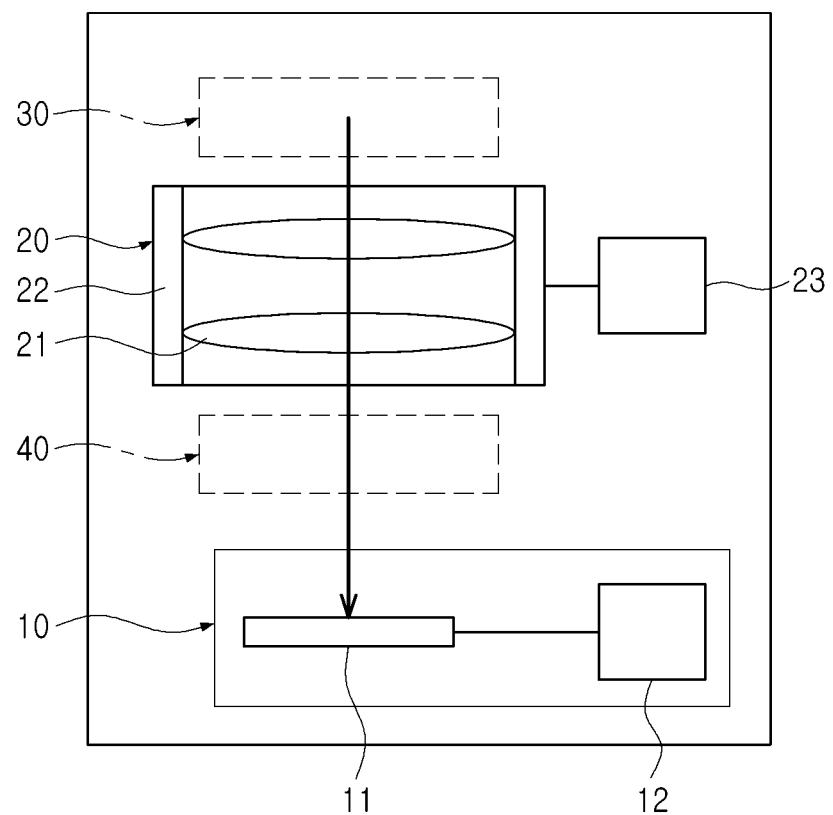
FIG. 1 schematically illustrates components constituting an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or an example may include or implement, means that at least one example or embodiment exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, expressions, for example, "between" and "immediately between" and "adjacent to" and "immediately adjacent to" may also be construed as described in the foregoing.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

In this document, the X-direction, the Y-direction, and the Z-direction indicate a direction parallel to the X-axis, a direction parallel to the Y-axis, and a direction parallel to the Z-axis illustrated in the drawings, respectively. In addition, unless otherwise stated, the X direction is a concept including both the +X-axis direction and the −X-axis direction, and this is also applied to the Y-direction and the Z-direction.

When two directions (or axes) are parallel to or perpendicular to each other in this document, it also includes examples in which the two directions (or axes) are substantially parallel to each other or substantially side by side. For example, the first axis and the second axis being perpendicular to each other indicates that the first axis and the second axis form an angle of 90 degrees or close to 90 degrees.

Paragraphs beginning with "in one/an example" in this document do not necessarily refer to the same examples. The specific features, structures, or characteristics may be combined in any suitable manner consistent with the present disclosure.

In this document, "configured to" indicates that a component includes a structure necessary to implement a certain function.

Hereinafter, an example of the present disclosure will be described in detail with reference to the drawings. However, the spirit of the present disclosure is not limited to the presented example. For example, those skilled in the art who understand the spirit of the present disclosure will be able to propose other examples included within the scope of the spirit of the present disclosure through addition, change or deletion of components, or the like, but this will also be included within the scope of the spirit of the present disclosure.

One or more examples relate to a method of implementing optical image stabilization by driving an image sensor.

Camera Module

FIG. 1 schematically illustrates components constituting an example camera module 1, in accordance with one or more embodiments.

In one example, a camera module 1 includes a lens module 20 including at least one lens 21 and a lens barrel 22 that accommodates the at least one lens 21, and an image sensor 11. Light L passes through the lens module 20 and contacts an imaging plane of the image sensor 11. The camera module 1 may include an AF driving unit 23 that moves the lens module 20 in the optical axis direction to adjust the focal length. The AF driving unit 23 may include, for example, a coil and a magnet facing each other. The coil is fixedly coupled to the lens module 20, the magnet is coupled to a fixed body such as a housing, and electromagnetic interaction between the coil and the magnet may cause the lens module 20 to move in the optical axis direction.

In an example, the camera module 1 may provide an optical image stabilization (hereinafter, 'OIS') function. The camera module 1 may provide an OIS function by driving the image sensor 11. For example, the camera module 1 may include an OIS driver 12 that moves or drives the image sensor 11 in a direction perpendicular to the optical axis, or rotates the image sensor about an axis parallel to the optical axis or about an axis perpendicular to the optical axis.

In an example, the camera module 1 may include a sensor shifting module 10. The sensor shifting module 10 may include components necessary to implement the OIS function by driving the image sensor 11. For example, the sensor shifting module 10 may include the image sensor 11 and the OIS driver 12 which drives the image sensor 11. As another example, the sensor shifting module 10 may mean only the OIS driver 12 excluding the image sensor 11.

In one example, the camera module 1 may further include an optical element in addition to the lens module 20 and the image sensor 11. In one example, the camera module 1 may include two or more lens modules. For example, a first optical element 30 and/or a second optical element 40 may be a lens module distinct from the lens module 20.

In an example, the camera module 1 may include an optical path changing element disposed in front of the lens module 20. For example, the first optical element 30 may be a prism or a mirror. In another example, the optical path changing element may be disposed between the image sensor 11 and the lens module 20. For example, the second optical element 40 may be a prism or a mirror.

Hereinafter, a sensor shifting module 100 or the OIS driver 120 described with reference to FIGS. 2 to 9B may be applied to the camera module 1 of FIG. 1.

2. Sensor Shift 2.1. Structure

Figure 2:
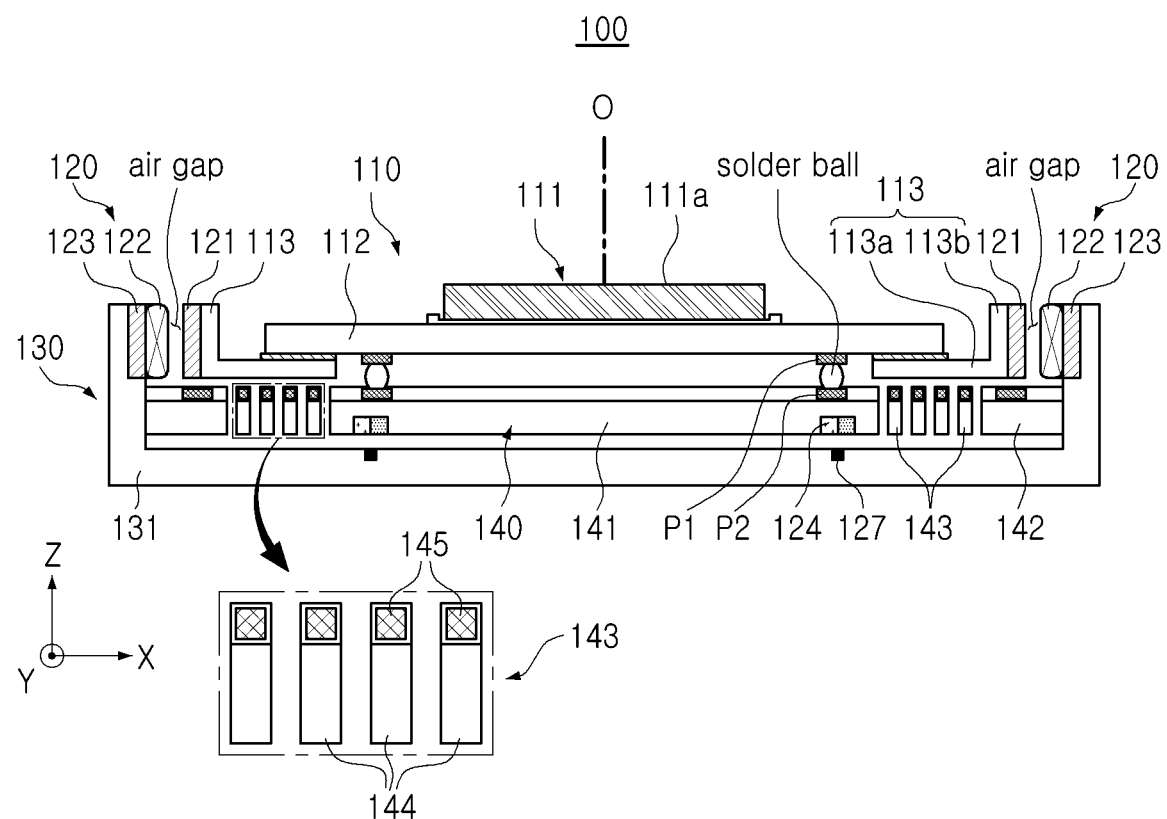
FIG. 2 illustrates an example sensor shifting module, in accordance with one or more embodiments.

FIG. 2 illustrates the sensor shifting module 100 according to an example. The sensor shifting module 100 may include an OIS driver 120 that drives an image sensor 111. In an example, the OIS driver 120 includes a movable body 110 including the image sensor 111, and a fixed body 130. The movable body 110 may be movably disposed inside the fixed body 130. The movable body 110 is a component that moves together with the image sensor 111. For example, the movable body 110 may include a sensor substrate 112 on which the image sensor 111 is mounted, and a sensor holder 113 coupled to the sensor substrate 112.

Referring to FIG. 2, the sensor holder 113 may include a plate 113a connected to the lower portion of the sensor substrate 112, and an extension portion 113b extending upwardly (e.g., in the +Z direction) from the edge of the plate 113a. The extension portion 113b may face a driving coil 122, and a driving yoke 121 may be seated on the extension portion 113b. In another example, the driving yoke 121 may be mounted on the fixed body 130, and the driving coil 122 may be mounted on the sensor holder 113. In this example, the driving coil 122 and/or the yoke 123 may be seated on the extension portion 113b.

A signal from the image sensor 111 may be transmitted to another electronic component (e.g., an image signal processor (ISP)) through the sensor substrate 112 and a connector 150.

The fixed body 130 may include a base 131 and components fixedly coupled to the base 131. For example, the fixed body 130 may include the driving coil 122 and a yoke 123 to be described later.

Through the OIS driver 120, the movable body 110 may move in a direction orthogonal to the direction in which the imaging plane 111a of the image sensor 111 faces. In an example, the OIS driver 120 may correct the shaking of the camera module 1 or the electronic device in which the image sensor 111 is mounted in a direction perpendicular to an optical axis O. The OIS driver 120 may move the image sensor 111 in a first direction and a second direction perpendicular to the optical axis O. The first direction and the second direction may intersect each other. For example, the OIS driver 120 may move the movable body 110 in the X direction and/or the Y direction perpendicular to the Z-axis, and accordingly, may correct shake in the X-direction and/or the Y-direction.

In an example, the OIS driver 120 may rotate the movable body 110 with respect to the fixed body based on an axis parallel to the optical axis O. The OIS driver 120 may correct rotation of the camera module 1 or the electronic device in which the image sensor 111 is mounted, based on an axis parallel to the optical axis O.

In one or more examples, the direction in which the imaging plane 111a of the image sensor 111 faces may be referred to as an optical axis O direction. For example, the movable body 110 may move in a direction perpendicular to the optical axis O with respect to the fixed body 130. In the drawings of the one or more examples, the optical axis (0) is illustrated parallel to the Z axis, and thus the Z direction indicates a direction parallel to the optical axis (0). In addition, the X direction or Y direction indicates a direction perpendicular to the optical axis (0). For example, in one or more examples, moving the movable body 110 in the X direction may be understood as moving the movable body 110 in a direction perpendicular to the optical axis O. In another example, it may be understood that the driving yoke 121 and the driving coil 122 opposing each other in the X direction indicates that the driving yoke 121 and the driving coil 122 face each other in a direction perpendicular to the optical axis O. Additionally, the X direction or the Y direction is an example of two directions perpendicular to the optical axis O and intersecting each other, and in the one or more examples, the X direction and the Y direction may be understood as two directions perpendicular to the optical axis O and intersecting each other.

2.1.1. PCB Spring

In an example, the sensor shifting module 100 may include a substrate 140 that mechanically connects the movable body 110 to the fixed body 130. The substrate 140 may couple the movable body 110 to the fixed body 130 to be movable with respect to the fixed body 130 in a direction perpendicular to the optical axis O. A portion of the substrate 140 may be deformed according to the movement of the movable body 110 with respect to the fixed body 130. For example, a portion of the substrate 140 may be flexible. When the substrate 140 is deformed, a restoring force is generated in the substrate 140, and this restoring force may return the movable body 110 to an original position thereof. The movable body 110 in the equilibrium state moves with respect to the fixed body 130 as a current is applied to the driving coil 122, and when the current does not flow in the driving coil 122, the movable body 110 may return to the original position by the substrate 140.

Figure 3:
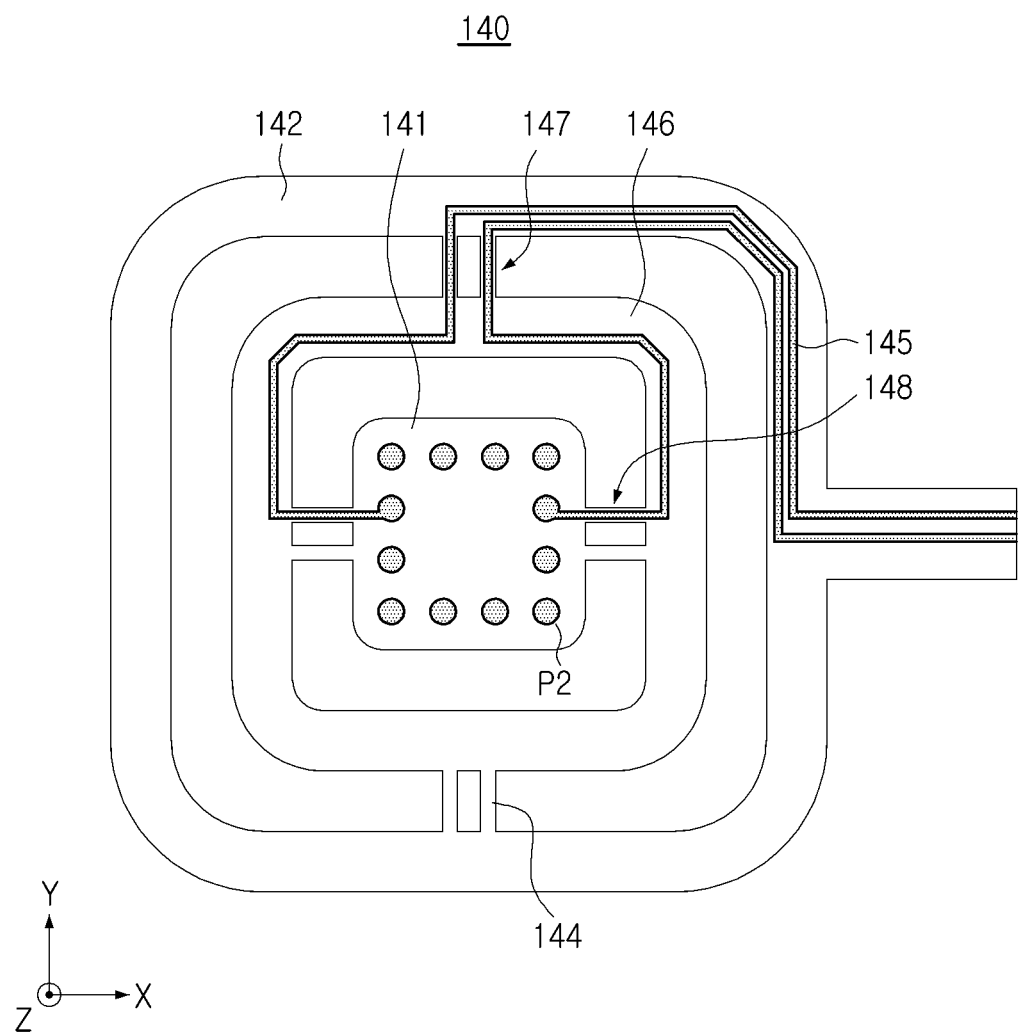
FIG. 3 illustrates a top view of a substrate on which an image sensor is mounted, in accordance with one or more embodiments.

FIG. 3 illustrates a top view of the substrate 140 on which the image sensor 111 is mounted, in accordance with one or more embodiments. Referring to FIGS. 2 and 3, the substrate 140 may include a floating part 141 on which the sensor substrate 112 is seated, and a fixed part 142 fixed to the fixed body 130. The sensor substrate 112 and the floating part 141 may be electrically connected to each other through solder balls at corresponding contact points P1 and P2.

While the movable body 110 (or the image sensor 111) moves with respect to the fixed body 130, the floating part 141 moves with respect to the fixed part 142. The substrate 140 may include a support part 143 connecting the floating part 141 and the fixed part 142 to each other. The support part 143 may be deformed at least partially according to a relative movement between the floating part 141 and the fixed body 130. In an example, the support part 143 may be formed of a flexible substrate. The flexible substrate may be provided in a form in which a conductive pattern (or an electric trace 145) is formed inside a film formed of a polyimide material.

In an example, the substrate 140 may include a plurality of bridge elements 144 connecting the floating part 141 and the fixed part 142. The plurality of bridge elements 144 may constitute at least a portion of the support part 143. The plurality of bridge elements 144 are formed of a flexible material, and may be deformed when the floating part 141 moves with respect to the fixed part 142. When the movable body 110 moves with respect to the fixed body 130, the floating part 141 may move with respect to the fixed part 142, and the bridge elements 144 may be deformed. The restoring force generated while the bridge elements 144 are deformed may return the movable body 110 or the floating part 141 to the original position thereof. The plurality of bridge elements 144 may respectively contain at least one electric trace 145. For example, the plurality of bridge elements 144 may mechanically and electrically connect the floating part 141 (or the movable body 110) to the fixed part 142 (or the fixed body 130). For example, the bridge elements 144 support the image sensor 111 and may function as a passage through which a signal of the image sensor 111 is transmitted.

In an example, the substrate 140 may include a guide 146 disposed between the floating part 141 and the fixed part 142. For example, the guide 146 may be provided in the form of a frame surrounding the floating part 141. The fixed part 142, the guide 146, and the floating part 141 may be connected via the bridge elements 144. For example, the substrate 140 may include a first bridge 147 extending from the floating part 141 to the guide 146, and a second bridge 148 extending from the guide 146 to the fixed part 142. The first bridge 147 and the second bridge 148 may extend in a direction perpendicular to the optical axis O. The first bridge 147 and the second bridge 148 may extend in directions intersecting each other. For example, the first bridge 147 may extend in the Y direction, and the second bridge 148 may extend in the Z direction.

The first bridge 147 and the second bridge 148 may each include one or more bridge elements 144. In FIG. 3, the first bridge 147 includes four bridge elements 144 extending in the X direction, and the second bridge 148 includes four bridge elements 144 extending in the Y direction. The substrate 140 of FIG. 3 has an illustrative shape, and the shape of the support part 143 connecting the floating part 141 and the fixed part 142 may be various. For example, the support part 143 may be comprised of the plurality of bridge elements 144 extending directly from the floating part 141 to the fixed part 142. As another example, the first bridge 147 or the second bridge 148 may include five bridge elements 144. The number of bridge elements 144 constituting the first bridge 147 or the second bridge 148 may be as many as the number corresponding to the number of terminals of the image sensor 111.

The substrate 140 may include the electric trace 145 that transmits a signal of the image sensor 111. The plurality of bridge elements 144 constituting the support part 143 embed the electric trace 145. The image sensor 111 is mounted on the sensor substrate 112, and the sensor substrate 112 is electrically connected to the fixed part 142 of the substrate 140. The electric trace 145 may extend from each of the contact points P2 formed in the floating part 141. The electric trace 145 may extend through bridge element 144 to fixed part 142. The electric trace 145 extending to the fixed part may be electrically connected to another substrate or electronic component.

On the other hand, FIG. 3 schematically illustrates the electric trace 145 formed on the substrate 140, and only the electric trace 145 extending from some contact points is illustrated for convenience of description.

2.1.2. Position Sensor

Referring to FIG. 2, in an example, the OIS driver 120 may include a position sensor 127 that may measure how much the movable body 110 moves in a direction perpendicular to the optical axis O, or how much the movable body rotates based on an axis parallel to the optical axis O. The position sensor 127 may be, as examples, a Hall sensor or a magnetoresistance sensor.

The OIS driver 120 may include a sensing magnet 124 that moves together with the movable body 110 and faces the position sensor 127. The position sensor 127 may be disposed to face the sensing magnet 124. For example, the position sensor 127 may be disposed on the base 131, and the sensing magnet 124 may be disposed on the substrate to face the position sensor 127 in the optical axis O direction (e.g., in the Z direction). As another example, the position sensor 127 may be disposed on the substrate, and the sensing magnet 124 may be disposed on the base 131. The position sensor 127 and the sensing magnet 124 may be provided in two or more pairs.

2.2. Actuator

Referring to FIG. 2, in an example, the OIS driver 120 may include a driving coil 122 coupled to one of the movable body 110 or the fixed body 130, and a driving yoke 121 coupled to the other one of the movable body 110 or the fixed body 130. For example, referring to FIG. 2, in an example, the driving coil 122 and the driving yoke 121 may be coupled to the base 131 and the sensor holder 113, respectively. The driving yoke 121 and the driving coil 122 may face each other in a direction perpendicular to the optical axis O. The electromagnetic interaction between the driving yoke 121 and the driving coil 122 causes the movable body 110 to move in a direction perpendicular to the optical axis O with respect to the fixed body 130. In addition, electromagnetic interaction between the driving yoke 121 and the driving coil 122 may rotate the movable body 110 with respect to the fixed body 130 about an axis parallel to the optical axis O.

In an example, the OIS driver 120 may further include a yoke 123 disposed on one side of the coil. The yoke 123 allows the magnetic field generated in the coil to be concentrated only in a direction toward the driving yoke 121. Since the yoke 123 is disposed on one side of the driving coil 122, the magnetic field generated by the driving coil 122 may be prevented from affecting other electronic components, or may significantly reduce the magnetic field from affecting other electronic components.

In one or more examples, the driving coil 122 and the driving yoke 121 are consistently described as being coupled to the fixed body 130 and the movable body 110, respectively. However, this is only an example, and in another example, the driving coil 122 and the driving yoke 121 may be coupled to the movable body 110 and the fixed body 130, respectively. For example, the driving coil 122 and the driving yoke 121 may be coupled to the sensor holder 113 and the base 131, respectively.

An air gap may be formed between the driving coil 122 and the driving yoke 121. Alternatively, the space between the driving coil 122 and the driving yoke 121 may be an air gap. For example, there may be no other member (e.g., a magnet) between the driving coil 122 and the driving yoke 121. The driving coil 122 and the driving yoke 121 directly face each other with an air gap therebetween.

FIG. 2 illustrates components of the OIS driver 120, and the one or more examples are not limited by the structure of FIG. 2.

2.2.1. Reluctance

In an example, the OIS driver 120 may not include a permanent magnet. In an example, when no current flows in the driving coil 122, the magnetic field due to the driving yoke 121 may be zero or a very small level. Accordingly, the magnetic field caused by the OIS driver 120 itself may be prevented or significantly reduced from affecting other electronic components (e.g., other electronic components inside the camera module 1, or other electronic components inside another camera module 1).

In an example, the driving yoke 121 may be formed of a soft magnetic material. A soft magnetic material has low coercive force and is magnetized when exposed to a magnetic field, but loses magnetism or may have a relatively low level of magnetism when the magnetic field disappears.

When a current is applied to the driving coil 122, the driving yoke 121 is magnetized, thereby generating a reluctance force between the driving coil 122 and the driving yoke 121. An attractive force is generated in a direction in which the driving yoke 121 and the driving coil 122 face each other, which causes the movable body 110 to move with respect to the fixed body 130 in the corresponding direction. For example, referring to FIG. 4, when current is applied to a first unit driving part 120-1 and a second unit driving part 120-2, an attractive force is generated between the driving coil 122 and the driving yoke 121 constituting the unit driving parts 120-1 and 120-2, which may move the movable body 110 in the −X direction. Conversely, when current is applied to a third unit driving part 120-3 and a fourth unit driving part 120-4, attractive force is generated between the driving coil 122 and the driving yoke 121 constituting the unit driving parts 120-3 and 120-4, which may move the movable body 110 in the +X direction.

2.2.2. Array (Translation+Rolling)

Figure 4:
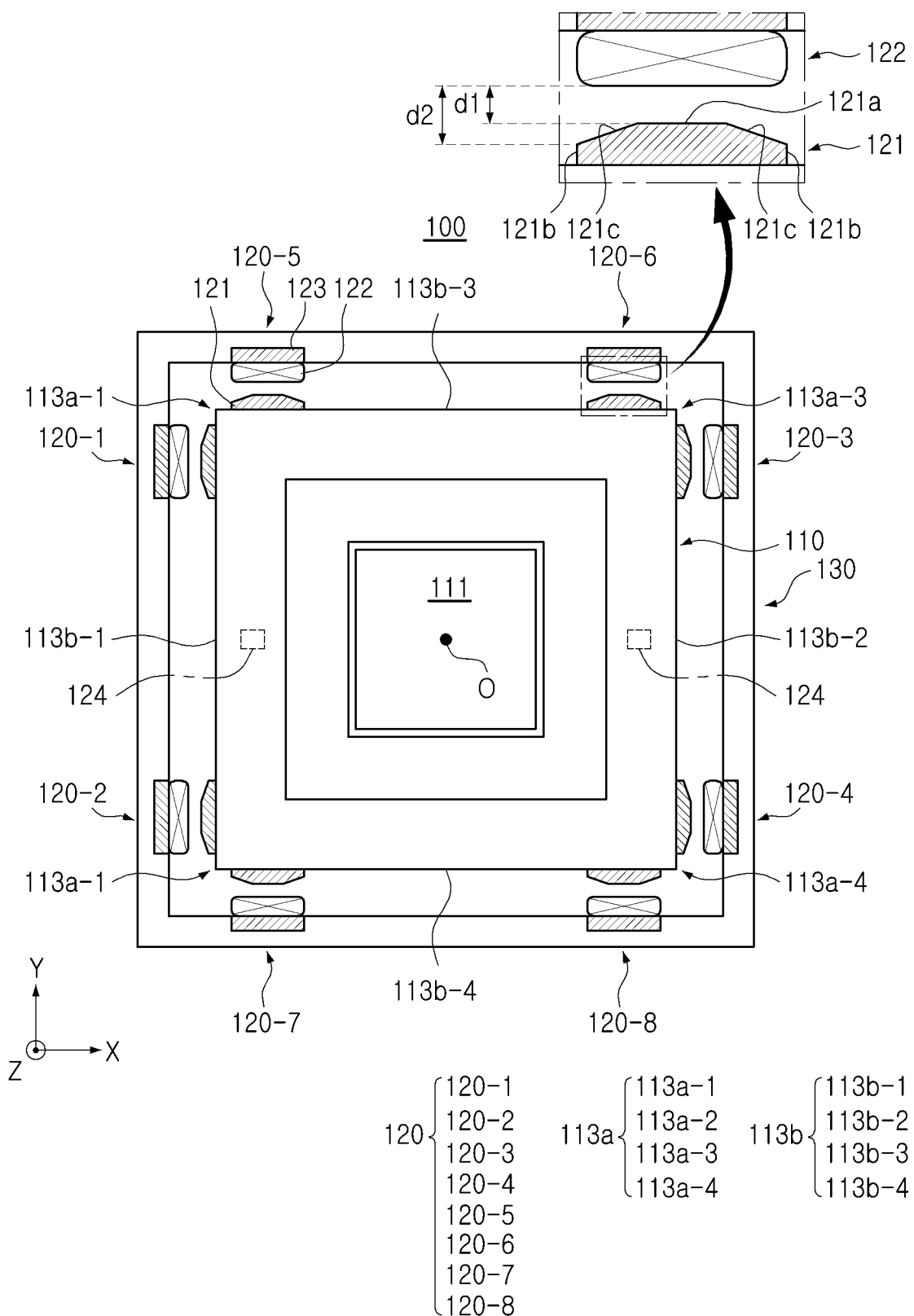
FIG. 4 is a top view of an example OIS driver, in accordance with one or more embodiments.

FIG. 4 is a top view of the OIS driver 120, in accordance with one or more embodiments.

The OIS driver 120 may include a plurality of unit driving parts 120-1, 120-2, 120-3, 120-4, 120-5, 120-6, 120-7, and 120-8. The unit driving parts 120-1, 120-2, 120-3, 120-4, 120-5, 120-6, 120-7, and 120-8 may each include one driving yoke 121 and one driving coil 122 facing each other. The driving yoke 121 and the driving coil 122 may be mounted to face each other on the movable body 110 or the fixed body 130. It may be understood that the unit driving parts 120-1, 120-2, 120-3, 120-4, 120-5, 120-6, 120-7, and 120-8 further include a yoke 123 disposed on one side of the driving coil 122.

In an example, the OIS driver 120 may include at least one unit driving part disposed in the −X direction and the +X direction of the movable body 110, respectively, to correct the shake in the X direction. For example, referring to FIG. 4, the OIS driver 120 may include a first unit driving part 120-1, a second unit driving part 120-2, a third unit driving part 120-3, and a fourth unit driving part 120-4. The first unit driving part 120-1 and the second unit driving part 120-2 are disposed in the −X direction of the movable body 110, and may move the movable body 110 in the −X direction when a current is applied. The third unit driving part 120-3 and the fourth unit driving part 120-4 are disposed in the +X direction of the movable body 110, and may move the movable body 110 in the +X direction when current is applied.

The first unit driving part 120-1 and the third unit driving part 120-3 may be arranged in a first direction (e.g., X direction) perpendicular to the optical axis O. Additionally, the second unit driving part 120-2 and the fourth unit driving part 120-4 may be arranged in the first direction. For example, when viewed in the first direction, the first unit driving part 120-1 and the third unit driving part 120-3 overlap each other, and the second unit driving part 120-2 and the fourth unit driving part 120-4 overlap each other.

In an example, the OIS driver 120 may include at least one unit driving part disposed in the −X direction and the +X direction of the movable body 110, respectively, to correct the shake in the X direction. For example, the OIS driver 120 may include a fifth unit driving part 120-5, a sixth unit driving part 120-6, a seventh unit driving part 120-7, and an eighth unit driving part 120-8. The fifth unit driving part 120-5 and the sixth unit driving part 120-6 are disposed in the +Y direction of the movable body 110, and may move the movable body 110 in the +Y direction when current is applied. The seventh unit driving part 120-7 and the eighth unit driving part 120-8 are disposed in the −Y direction of the movable body 110, and may move the movable body 110 in the −Y direction when current is applied.

The fifth unit driving part 120-5 and the seventh unit driving part 120-7 may be arranged in a second direction (e.g., a Y direction) perpendicular to the optical axis O. Additionally, the sixth unit driving part 120-6 and the eighth unit driving part 120-8 may be arranged in the second direction. For example, when viewed in the second direction, the fifth unit driving part 120-5 and the seventh unit driving part 120-7 overlap each other, and the sixth unit driving part 120-6 and the eighth unit driving part 120-8 overlap each other.

In an example, the movable body 110 has four side surfaces 113b-1, 113b-2, 113b-3, and 113b-4 that form a quadrangle, and a driving coil 122 or a driving yoke 121 may be disposed adjacently to ends of each of the four side surfaces 113b-1, 113b-2, 113b-3 and 113b-4. The first unit driving part 120-1 and the second unit driving part 120-2 may be disposed on the first side surface 113b-1 of the movable body 110, and may be spaced apart from each other. For example, the first side surface 113b-1 may face the −X direction, and the first unit driving part 120-1 and the second unit driving part 120-2 may be spaced apart from each other in the Y direction. The first unit driving part 120-1 and the second unit driving part 120-2 may be disposed adjacently to both ends of the first side surface 113b-1, respectively. When viewed in the X direction, the optical axis O (or the image sensor 111) may be positioned between the first unit driving part 120-1 and the second unit driving part 120-2. Accordingly, when a current is applied to either the first unit driving part 120-1 or the second unit driving part 120-2, a Z-axis moment may be generated in the movable body 110, which causes the movable body 110 to be rotated with respect to the fixed body about the Z axis.

The third unit driving part 120-3 and the fourth unit driving part 120-4 are disposed on the second side surface 113b-2 of the movable body 110 and are spaced apart from each other. The second side surface 113b-2 and the first side surface 113b-1 face opposite directions. For example, the second side surface 113b-2 may face the +X direction, and the third unit driving part 120-3 and the fourth unit driving part 120-4 may be spaced apart from each other in the Y direction. The third unit driving part 120-3 and the fourth unit driving part 120-4 may be disposed close to both ends of the second side surface 113b-2, respectively. When viewed in the X direction, the optical axis O (or the image sensor 111) may be positioned between the third unit driving part 120-3 and the fourth unit driving part 120-4. Accordingly, when a current is applied to either the third unit driving part 120-3 or the fourth unit driving part 120-4, a Z-axis moment may be generated in the movable body 110, which causes the movable body 110 to be rotated with respect to the fixed body about the Z axis.

The fifth unit driving part 120-5 and the sixth unit driving part 120-6 are disposed on the third side surface 113b-3 of the movable body 110 and are spaced apart from each other. The fifth unit driving part 120-5 and the sixth unit driving part 120-6 may be spaced apart from each other in the X direction. The fifth unit driving part 120-5 and the sixth unit driving part 120-6 may be disposed close to both ends of the third side surface 113b-3, respectively. When viewed in the Y direction, the optical axis O (or the image sensor 111) may be positioned between the fifth unit driving part 120-5 and the sixth unit driving part 120-6. Accordingly, when a current is applied to one of the fifth unit driving part 120-5 or the sixth unit driving part 120-6, a Z-axis moment may be generated in the movable body 110, which causes the movable body 110 to be rotated with respect to the fixed body about the Z axis.

The seventh unit driving part 120-7 and the eighth unit driving part 120-8 are disposed on the fourth side surface 113b-4 of the movable body 110, and are spaced apart from each other. The fourth side surface 113b-4 faces opposite directions to the third side surface 113b-3. The seventh unit driving part 120-7 and the eighth unit driving part 120-8 may be spaced apart from each other in the X direction. The seventh unit driving part 120-7 and the eighth unit driving part 120-8 may be disposed close to both ends of the fourth side surface 113b-4. When viewed in the Y direction, the optical axis O (or the image sensor 111) may be positioned between the seventh unit driving part 120-7 and the eighth unit driving part 120-8. Accordingly, when a current is applied to one of the seventh unit driving part 120-7 or the eighth unit driving part 120-8, a Z-axis moment may be generated in the movable body 110, which causes the movable body 110 to be rotated with respect to the fixed body about the Z axis.

The OIS driver 120 may include a plurality of unit driving parts to correct rotation with respect to an axis parallel to the optical axis O. The OIS driver 120 may include at least one unit driving part generating a Z-axis moment in the movable body 110.

For example, when current is applied to at least one of the first unit driving part 120-1, the fourth unit driving part, the sixth unit driving part 120-6, or the seventh unit driving part, a moment in the +Z direction (direction coming out of the ground) may be generated in the movable body 110 by the attractive force between the driving yoke and the driving coil. For another example, when current is applied to at least one of the second unit driving part 120-2, the third unit driving part, the fifth unit driving part, or the eighth unit driving part, a moment in the −Z direction (the direction entering the ground) may occur in the movable body 110 by the attractive force between the driving yoke and the driving coil.

In an example, the unit driving part may be disposed adjacent to a corner of the movable body 110. The movable body 110 includes a first side surface 113b-1 and a third side surface 113b-3 extending in different directions from a first corner 113a-1, respectively. The first unit driving part 120-1 is disposed on the first side surface 113b-1, to be close to the first corner 113a-1, and the fifth unit driving part is disposed on the third side surface 113b-3, to be close to the first corner 113a-1. The movable body 110 includes the first side surface 113b-1 and the fourth side surface 113b-4 extending in different directions from a second corner 113a-2, respectively. The second unit driving part 120-2 is disposed on the first side surface 113b-1, to be close to the second corner 113a-2, and the seventh unit driving part 120-2 is disposed on the fourth side surface 113b-4, to be close to the second corner 113b-4. The movable body 110 includes the second side surface 113b-2 and the third side surface 113b-3 extending in different directions from the third corner 113a-3, respectively. The third unit driving part 120-3 is disposed on the second side surface 113b-2, to be close to the third corner 113a-3, and the sixth unit driving part 120-6 is disposed on the third side surface 113b-3, to be close to the third corner 113a-3. The movable body 110 includes the second side surface 113b-2 and the fourth side surface 113b-4 extending in different directions from the fourth corner 113a-4, respectively. The fourth unit driving part 120-4 is disposed on the second side surface 113b-2, to be close to the fourth corner 113a-4, and the eighth unit driving part 120-4 is disposed on the fourth side surface 113b-4, to be close to the fourth corner 113a-4.

In one or more examples, being disposed close to the corner may indicate that the unit driving part is spaced apart from the optical axis O when viewed from the side. For example, when viewed in the X direction, the first unit driving part 120-1 may be disposed at a position away from the optical axis O in the +Y direction. Alternatively, when viewed in the Y direction, the fifth unit driving part 120-5 may be disposed at a position away from the optical axis O in the −X direction. Accordingly, the unit driving part may generate a moment in the direction parallel to the optical axis O in the movable body 110.

The arrangement or number of the unit driving parts illustrated in FIG. 4 is merely an example, and the one or more examples are not limited thereto. For example, additional unit driving parts other than the unit driving parts illustrated in FIG. 4 may be provided. As another example, a portion of the unit driving parts illustrated in FIG. 4 may be omitted.

Referring to FIG. 4, the driving yoke 121 may be configured so that it does not interfere with the corresponding driving coil 122 when the movable body 110 rotates. In an example, a surface of the driving yoke 121, opposite to the driving coil 122, may be convex. The thickness of the driving yoke 121 may decrease from a central portion 121a to both ends 121b. Since the driving yoke 121 is provided to be convex, the rotation range of the movable body 110 may be increased.

For example, the opposite surface of the driving yoke 121 to the driving coil 122 may include an inclined surface 121c extending from the central portion 121a to both ends 121b. Referring to the enlarged view of the upper right of FIG. 4, the driving yoke 121 and the driving coil 122 face in the Y direction perpendicular to the optical axis O, and a distance d1 between the central portion 121a of the driving yoke 121 and the driving coil 122 in the Y direction may be shorter than a distance d2 between an end 121b of the driving yoke 121 and the driving coil 122 in the Y direction.

2.3. Movement
2.3.1. Translation

FIGS. 5A to 5D illustrate the movement of the movable body 110 based on the OIS driver 120 of FIG. 4.

Figure 5A:
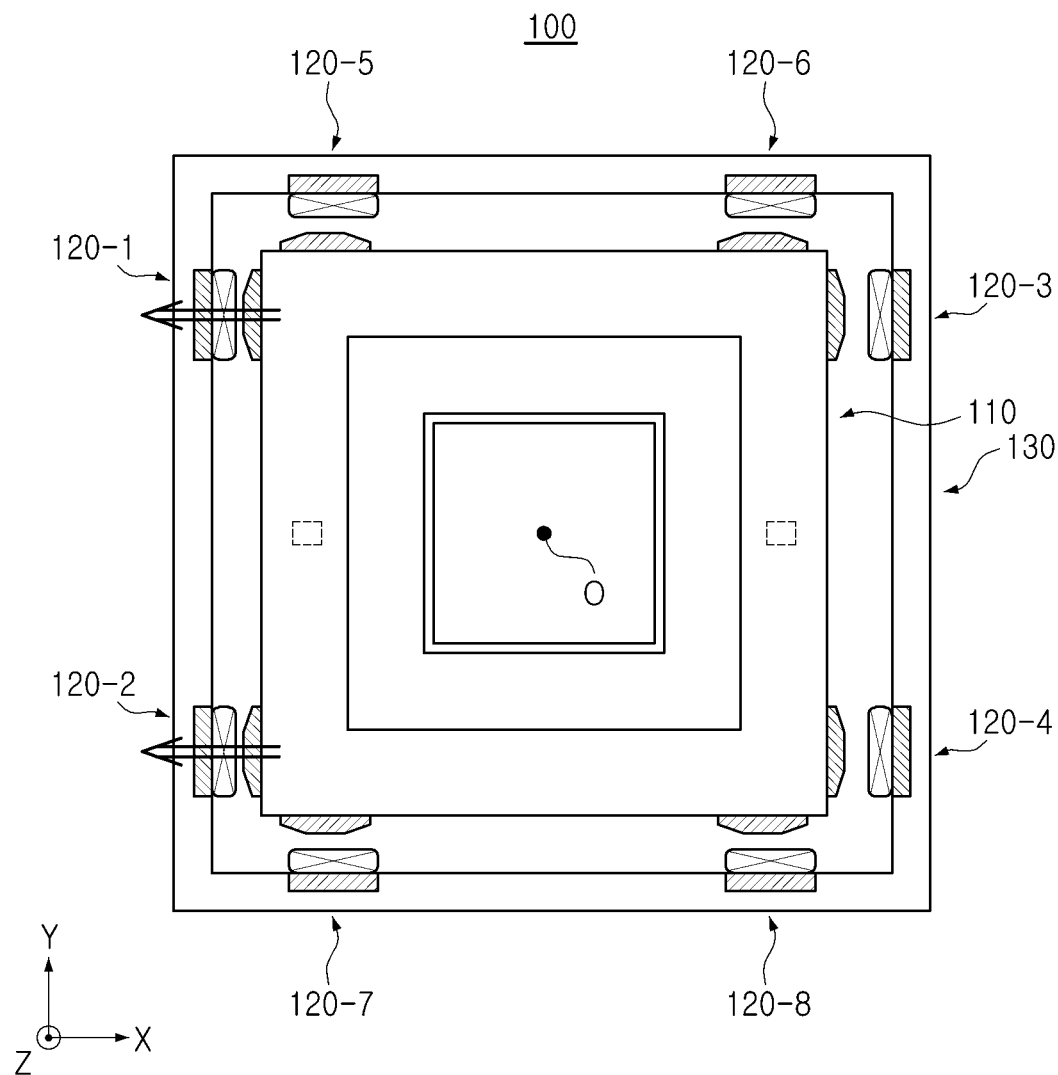
FIG. 5A, FIG. 5B, FIG. 5C, and FIG. 5D illustrate a movement of a movable body based on the OIS driver of FIG. 4.
Figure 5B:
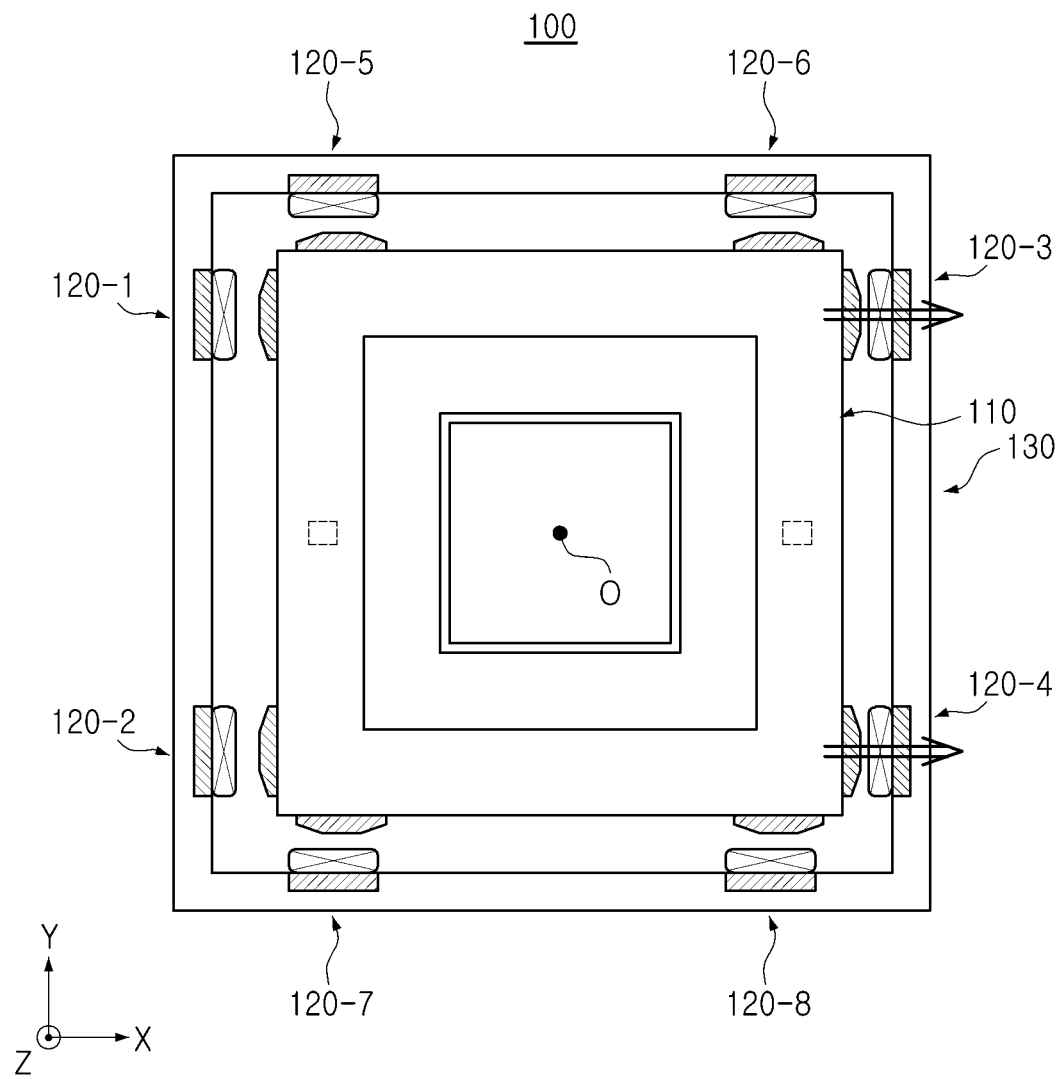
Figure 5C:
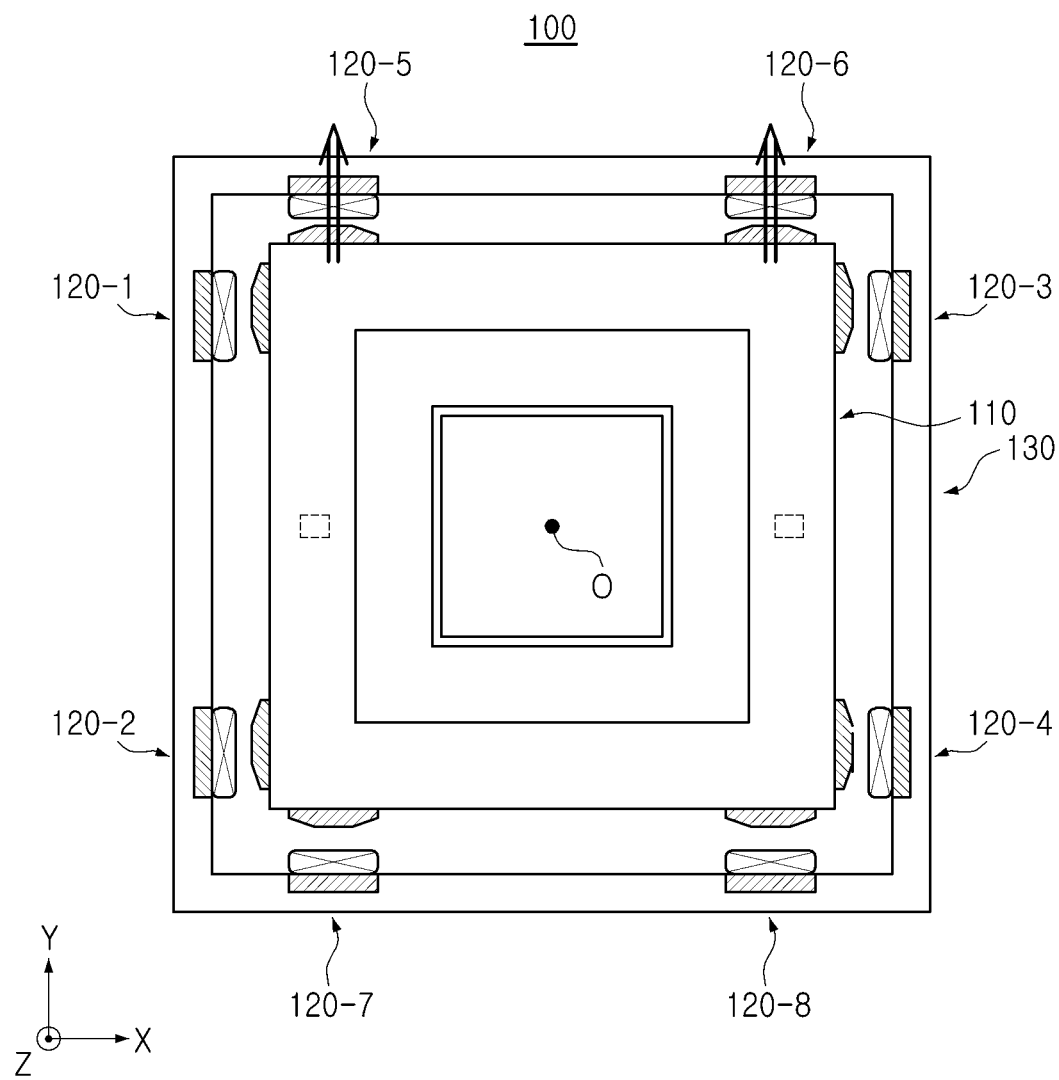
Figure 5D:
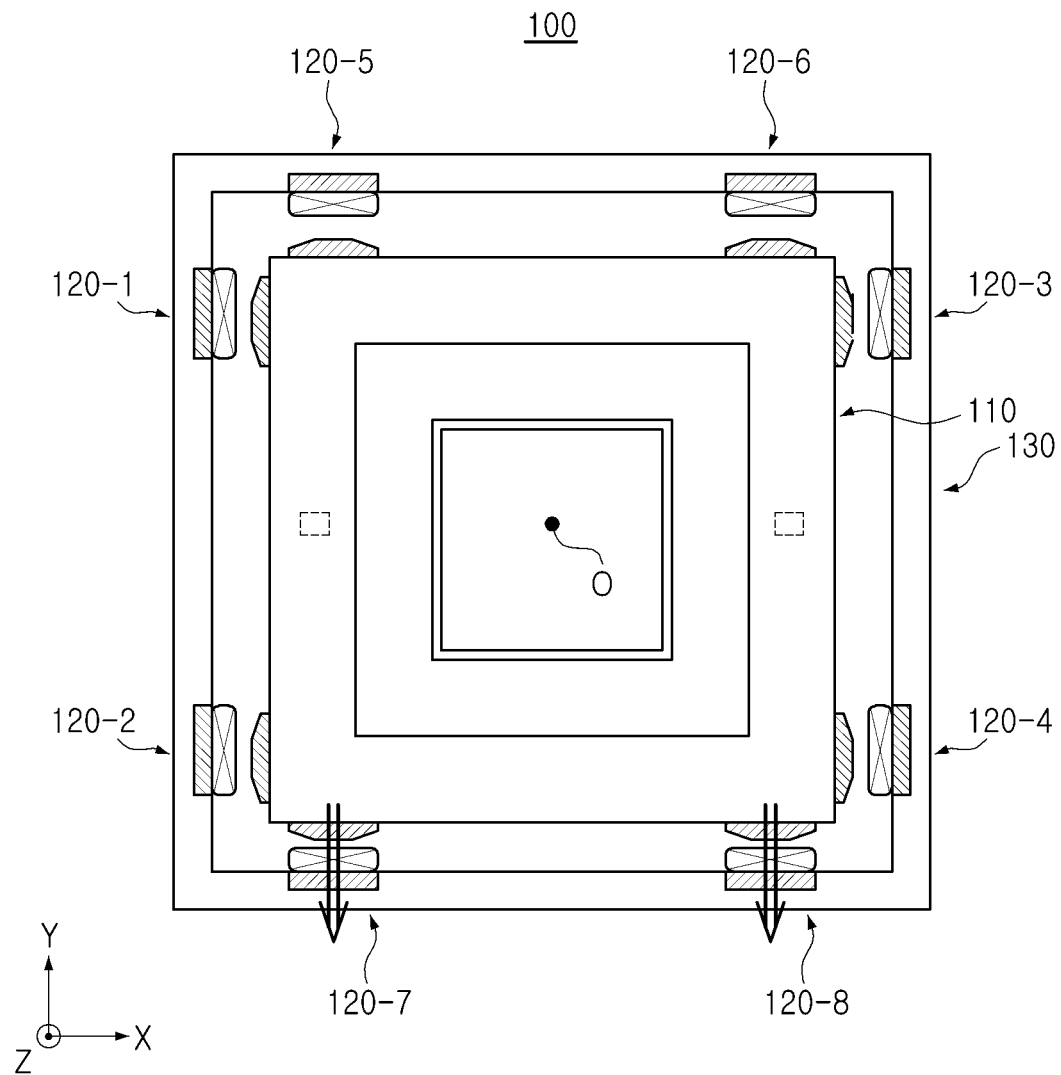

Referring to FIG. 5A, when current is applied to the first unit driving part 120-1 and the second unit driving part 120-2, a force in the direction of the arrow is applied to the movable body 110, which causes the movable body 110 to move in the −X direction. Referring to FIG. 5B, when a current is applied to the third unit driving part 120-3 and the fourth unit driving part 120-4, a force in the direction of the arrow acts on the movable body 110, which causes the movable body 110 to move in the +X direction. Referring to FIG. 5C, when current is applied to the fifth unit driving part 120-5 and the sixth unit driving part 120-6, a force in the direction of the arrow is applied to the movable body 110, which causes the movable body 110 to move in the +Y direction. Referring to FIG. 5D, when a current is applied to the seventh unit driving part 120-7 and the eighth unit driving part 120-8, a force in the direction of the arrow acts on the movable body 110, which causes the movable body 110 to move in the −Y direction.

2.3.2. Rolling

Figure 6:
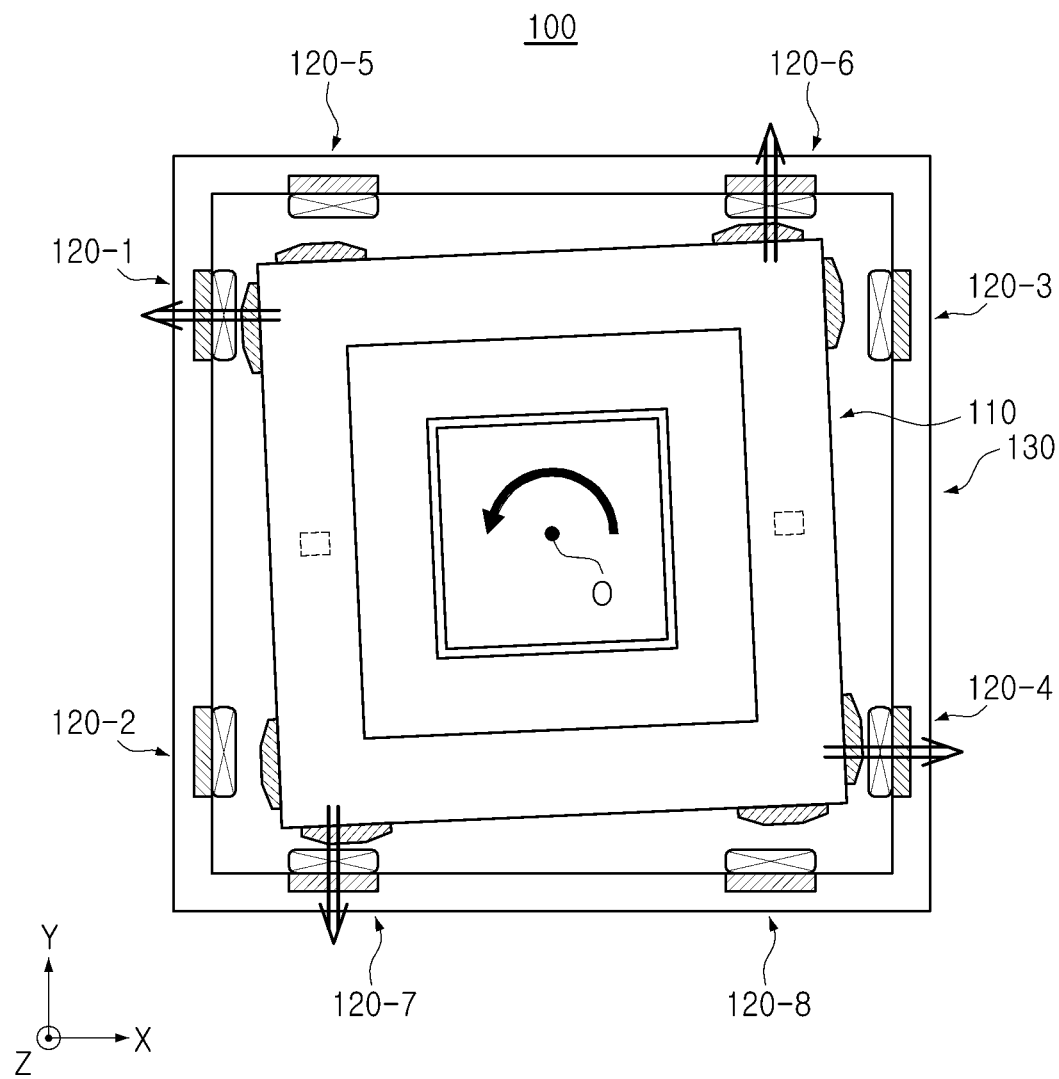
FIG. 6 and FIG. 7 illustrate a rotation of the movable body based on the OIS driver of FIG. 4.
Figure 7:
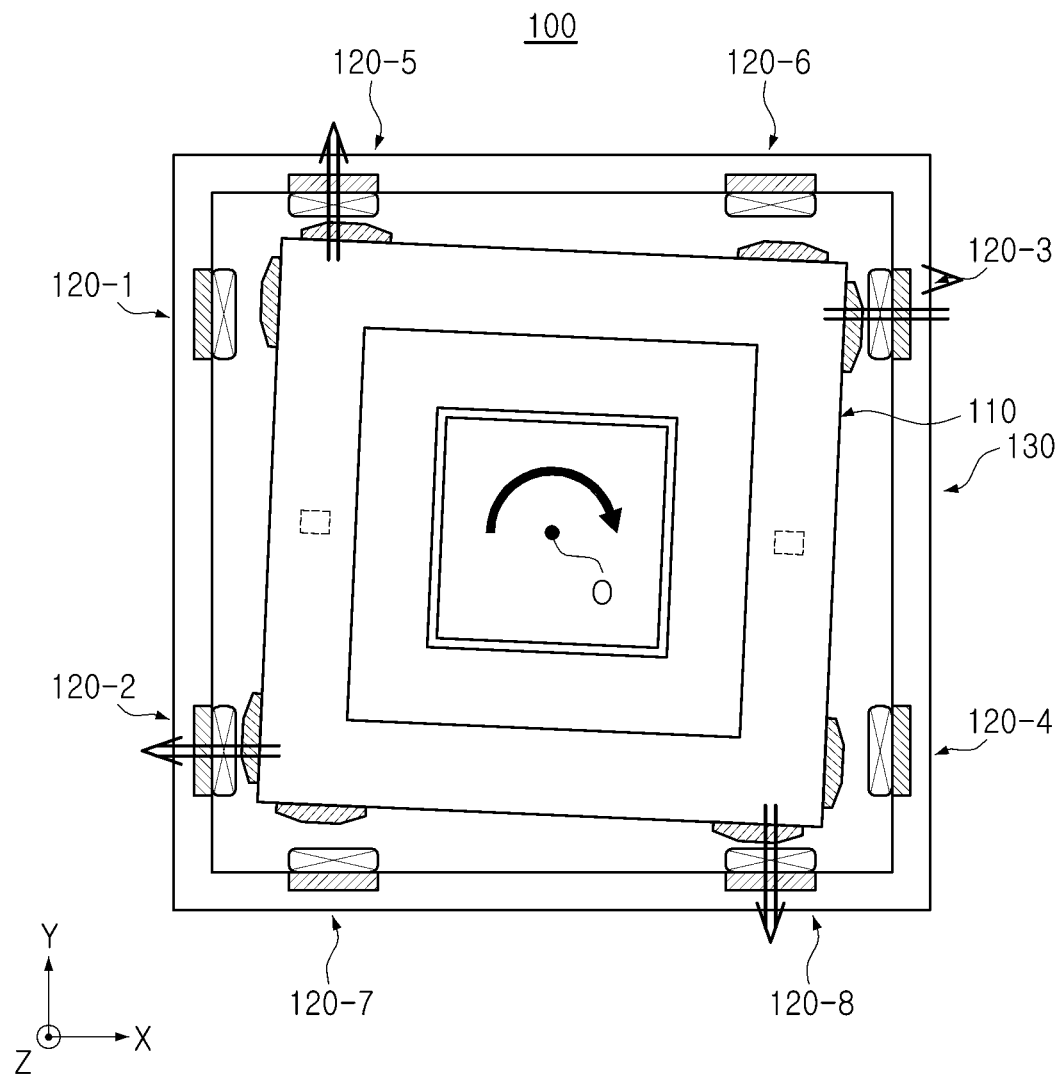

FIGS. 6 and 7 illustrate rotation of the movable body 110 by the OIS driver 120 of FIG. 4.

Referring to FIG. 6, when a current is applied to the first unit driving part 120-1, the fourth unit driving part, the sixth unit driving part 120-6, or the seventh unit driving part, the force of the respective driving parts in the direction of the arrow generates a +Z-direction moment in the movable body 110, which may rotate the movable body 110 counterclockwise with respect to the fixed body.

Referring to FIG. 7, when current is applied to the second unit driving part 120-2, the third unit driving part, the fifth unit driving part, or the eighth unit driving part, the force of the respective driving parts in the direction of the arrow generates −Z direction moment in the movable body 110, which may rotate the movable body 110 clockwise with respect to the fixed body.

2.5. Flexible Substrate Deformation

FIGS. 8A to 8D illustrate deformation of the substrate 140 according to the movement of the movable body 110, in accordance with one or more embodiments.

Figure 8A:
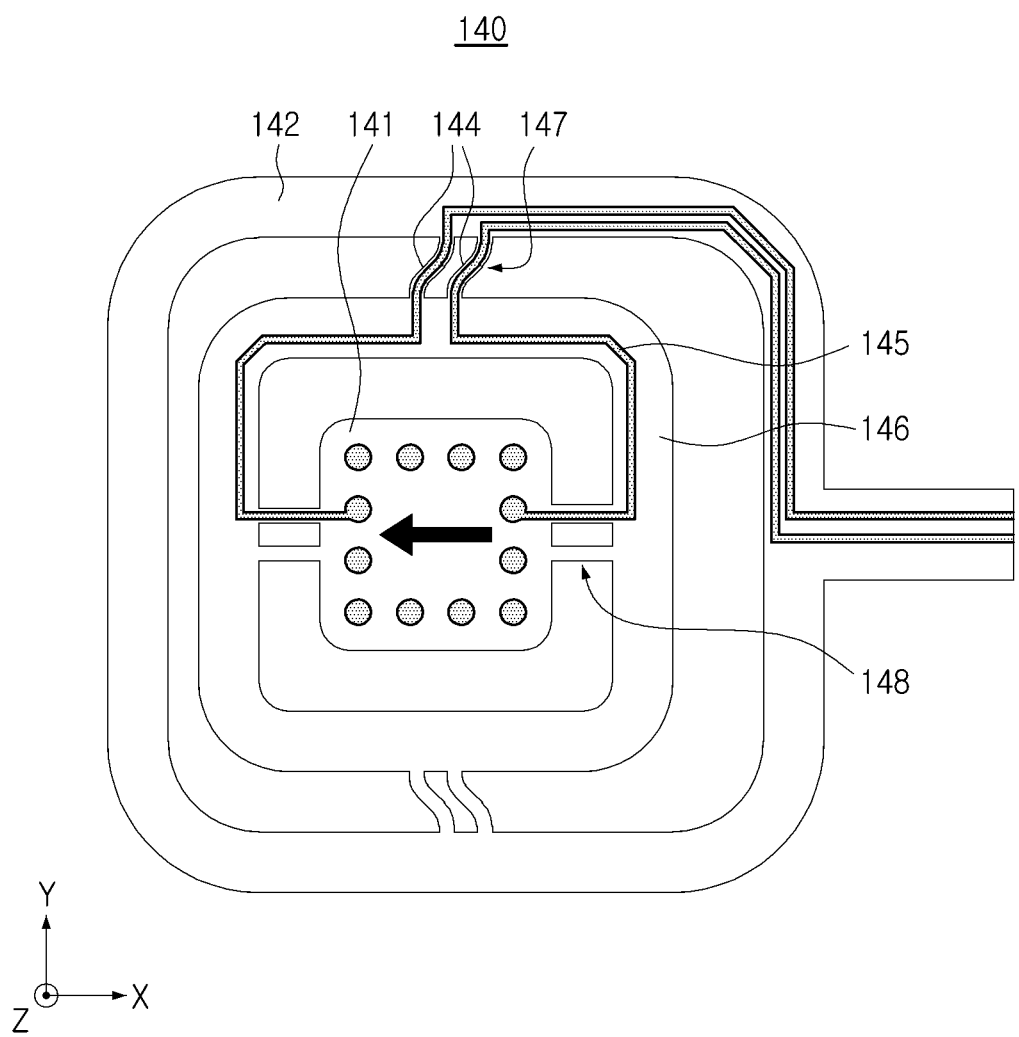
FIG. 8A, FIG. 8B, FIG. 8C, and FIG. 8D illustrate the deformation of a substrate, in accordance with one or more embodiments.

Referring to FIG. 8A, when the movable body 110 moves in the −X direction, the floating part 141 of the substrate 140 also moves in the −X direction, and therefore, the first bridge 147 connecting the guide 146 and the fixed part 142 to each other may be deformed. Since the bridge elements 144 constituting the first bridge 147 have elasticity, the deformed first bridge 147 provides a restoring force to return the floating part 141 to the direction (e.g., the +X direction) opposite to the moving direction. Accordingly, when no current is applied to the OIS driver 120, the floating part 141 moves in the −X direction.

Figure 8B:
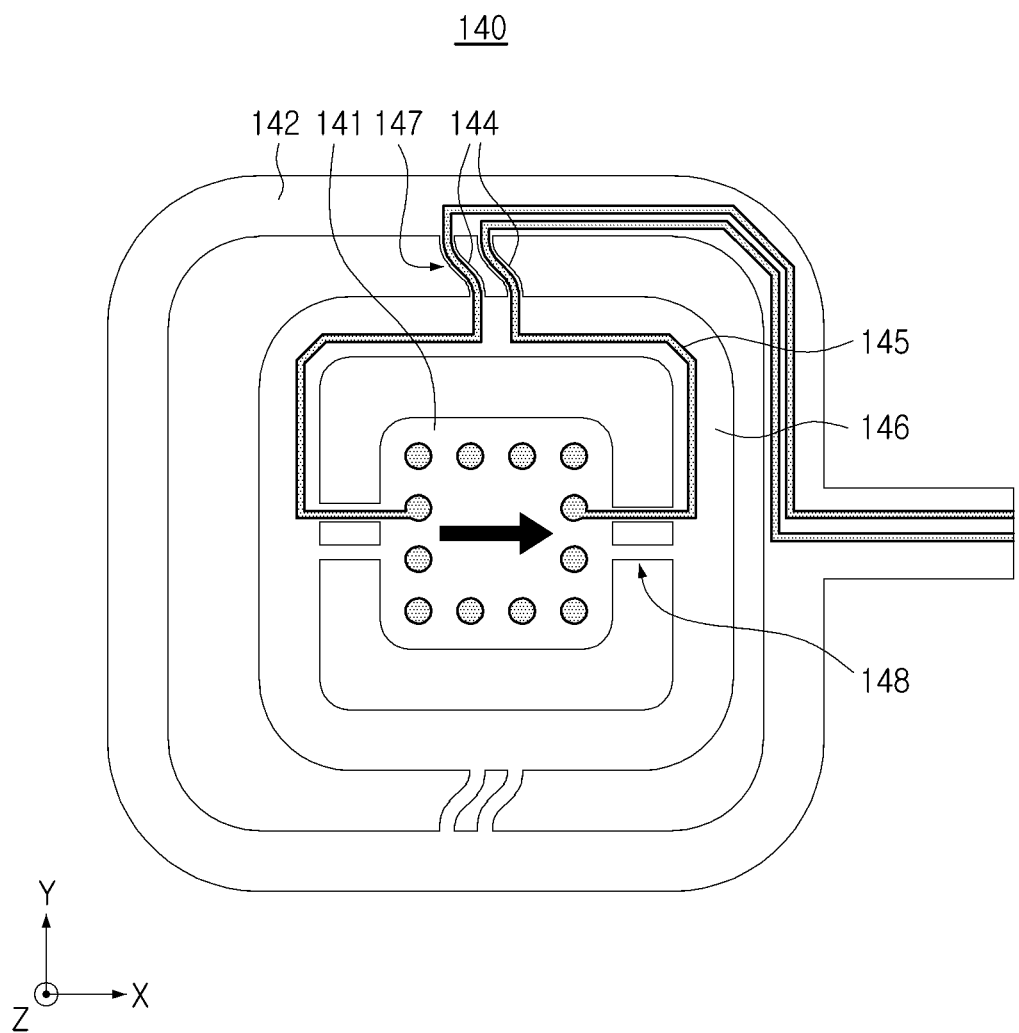

Referring to FIG. 8B, when the movable body 110 moves in the +X direction, the floating part 141 of the substrate 140 also moves in the +X direction, and thus, the first bridge 147 connecting the guide 146 and the fixed part 142 to each other is deformed. Since the bridge elements 144 constituting the first bridge 147 have elasticity, the deformed first bridge 147 provides a restoring force to return the floating part 141 to the direction (e.g., the −X direction) opposite to the moving direction.

Figure 8C:
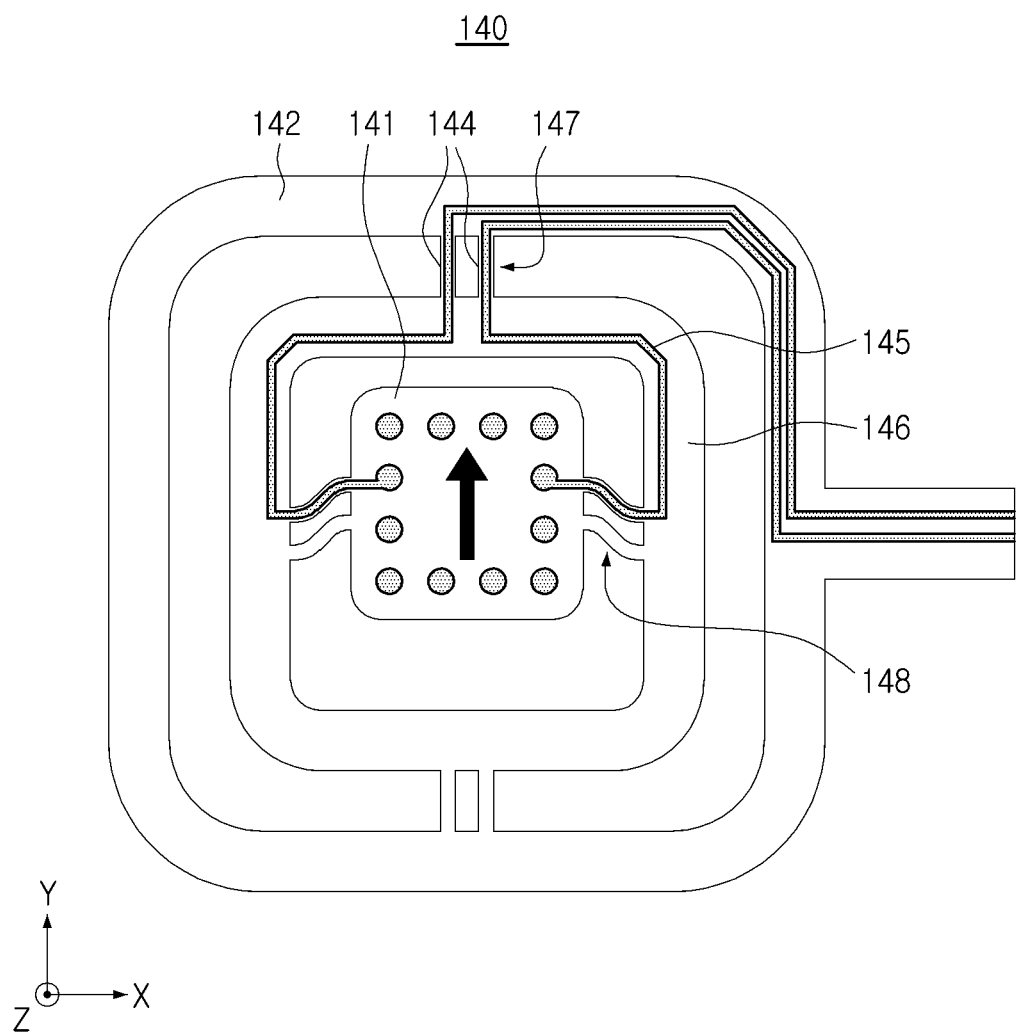

Referring to FIG. 8C, when the movable body 110 moves in the +Y direction, the floating part 141 of the substrate 140 also moves in the +Y direction, and thus, the second bridge 148 connecting the guide 146 and the fixed part 142 is deformed. Since the bridge elements 144 constituting the second bridge 148 have elasticity, the deformed second bridge 148 provides a restoring force to return the floating part 141 to the direction (e.g., the −Y direction) opposite to the moving direction.

Figure 8D:
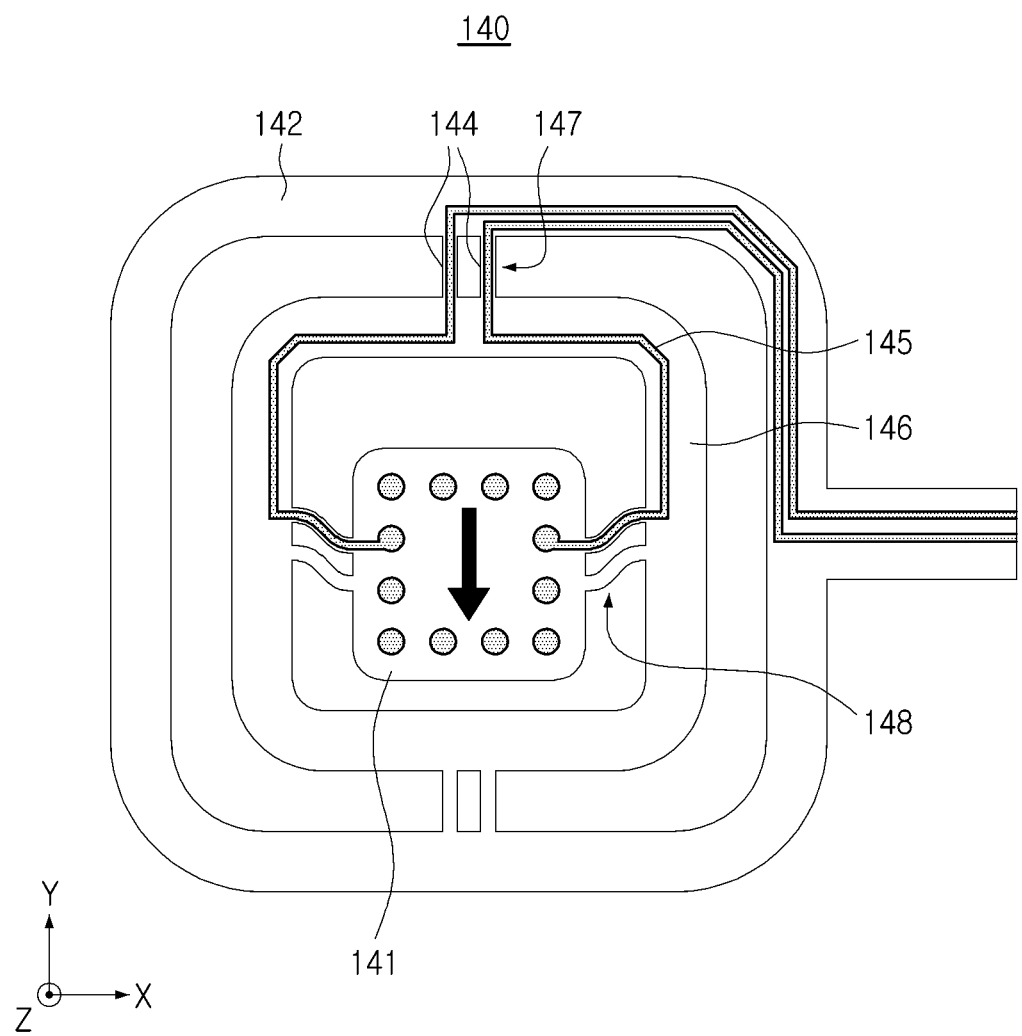

Referring to FIG. 8D, when the movable body 110 moves in the −Y direction, the floating part 141 of the substrate 140 also moves in the −Y direction, and thus, the second bridge 148 connecting the guide 146 and the fixed part 142 is deformed. Since the bridge elements 144 constituting the second bridge 148 have elasticity, the deformed second bridge 148 provides a restoring force to return the floating part 141 to the direction (e.g., the +Y direction) opposite to the moving direction.

Although the rotation of the movable body 110 is not described in FIGS. 8A to 8B, the substrate may provide a restoring force in the opposite direction according to the rotation of the movable body 110. For example, when the movable body 110 rotates counterclockwise as illustrated in FIG. 6, the bridge elements of the substrate are deformed to provide a clockwise restoring force to the movable body 110. When the movable body 110 rotates in the clockwise direction as illustrated in FIG. 7, the bridge elements of the substrate are deformed to provide a counterclockwise restoring force to the movable body 110.

2.6. Mover Change

Figure 9A:
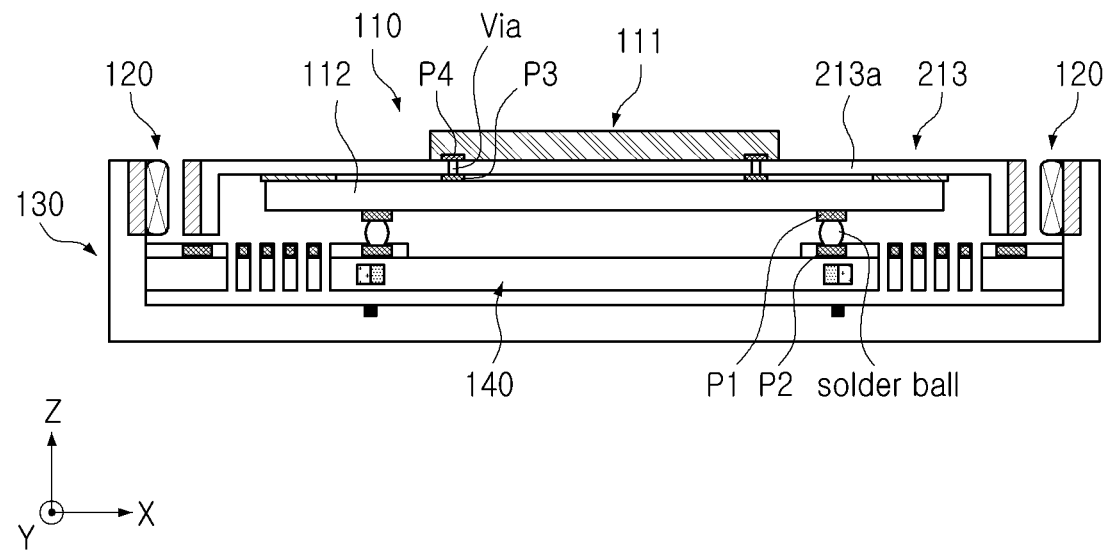
FIG. 9A and FIG. 9B illustrate a sensor holder of a different type from that of FIG. 2.
Figure 9B:
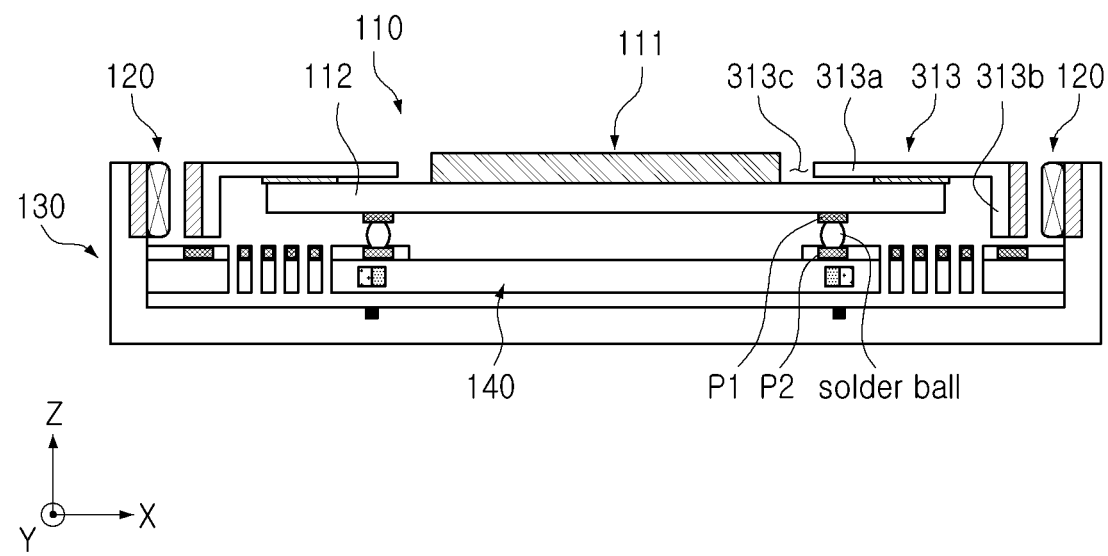

FIGS. 9A and 9B illustrate a sensor holder 213 in a different form from that of FIG. 2.

Referring to FIG. 9A, the sensor holder 213 may be disposed on the sensor substrate 112. In an example, the sensor holder 213 includes a plate 213a disposed on the sensor substrate 112, and an extension 213b that extends downward (e.g., in the −Z direction) from the edge of the plate 213a. The extension 213b faces the driving coil (e.g., the driving coil 122 of FIG. 2) of the OIS driver 120, and the driving yoke (e.g., the driving yoke 121 of FIG. 2) of the OIS driver 120 may be seated on the extension 213b. In another example, the driving yoke is mounted on the fixed body 130 and the driving coil may be mounted on the sensor holder 213. In this example, the driving coil and/or the yoke (e.g., the yoke 123 in FIG. 2) may be seated on the extension 213b. Compared with the sensor holder 213 of FIG. 2, the sensor holder 213 of FIG. 9A may be more advantageous in avoiding interference with a solder ball connecting the sensor substrate 112 and the substrate 140. Additionally, when the sensor holder 213 is disposed on the upper side of the sensor substrate 112, the thickness of the sensor holder 213 may be relatively freely increased, which may improve the mechanical rigidity of the sensor holder 213.

Referring to FIG. 9A, the image sensor 111 may be electrically connected to the sensor substrate 112 through conductive vias.

Referring to FIG. 9B, the sensor holder 313 may be disposed on the sensor substrate 112. In an example, the sensor holder 313 may include a plate 313a disposed on the sensor substrate 112, and an extension 313b that extends downward (e.g., in the −Z direction) from the edge of the plate 313a. The extension 313b faces the driving coil (e.g., the driving coil 122 of FIG. 2) of the OIS driver 120, and the driving yoke (e.g., the driving yoke 121 of FIG. 2) of the OIS driver 120 may be seated on the extension 313b. In an example, the driving yoke may be mounted on the fixed body 130 and the driving coil may be mounted on the sensor holder 313. In this example, the driving coil and/or the yoke (e.g., the yoke 123 in FIG. 2) may be seated on the extension 313b. Compared with the sensor holder 313 of FIG. 2, the sensor holder 313 of FIG. 9B may be more advantageous in avoiding interference with the solder ball connecting the sensor substrate 112 and the substrate 140. Additionally, when the sensor holder 313 is disposed on the upper side of the sensor substrate 112, the thickness of the sensor holder 313 may be relatively freely increased, which may improve the mechanical rigidity of the sensor holder 313.

Referring to FIG. 9B, the image sensor 111 may be directly mounted on the sensor substrate 112. Accordingly, the sensor holder 313 may include a through portion 313c in a portion corresponding to the image sensor 111. The image sensor 111 is seated on the sensor substrate 112, and a terminal of the image sensor 111 and a terminal of the sensor substrate 112 may be connected to each other through wire bonding.

As set forth above, according to an example, the camera may provide an effective optical image stabilization operation even with a small amount of power. Alternatively, in an example, the effect of a magnetic field of an actuator driving the image sensor on an electronic component disposed outside the camera may be eliminated or significantly reduced.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting module, comprising:
a fixed body;
a movable body, movably disposed inside the fixed body, and comprising an image sensor having an imaging plane oriented in an optical axis direction; and
a driving unit, configured to move the movable body in a direction, perpendicular to the optical axis direction, with respect to the fixed body, and configured to rotate the movable body about the optical axis direction,
wherein the driving unit comprises driving coils coupled to one of the fixed body and the movable body, and driving yokes coupled to the other one of the fixed body and the movable body,
wherein parallel surfaces of the driving yokes and the driving coils face each other in a direction perpendicular to the optical axis direction,
wherein, when a current is applied to the driving coils, the movable body is configured to move in a direction perpendicular to the optical axis direction based on an electromagnetic interaction between each of the driving coils and each of the driving yokes, or is configured to rotate about the optical axis direction, and
wherein a surface of the driving yokes, disposed opposite to the driving coils, comprises an inclined surface that extends from a central portion of the driving yokes to ends of the driving yokes.

2. The module of claim 1, wherein the movable body has four side surfaces which form a quadrangle, and the driving coils or the driving yokes are disposed adjacent to ends of the four side surfaces.

3. The module of claim 1, wherein the driving unit comprises a first unit driving part, a second unit driving part, a third unit driving part and a fourth unit driving part, each comprising a driving coil of the driving coils and a driving yoke of the driving yokes that are configured to move each of the first unit driving part, the second unit driving part, the third unit driving part and the fourth unit driving part in a first direction, perpendicular to the optical axis direction, and respectively face the first direction, and
wherein the first unit driving part and the second unit driving part are spaced apart from each other on a first side surface of the movable body, and the third unit driving part and the fourth unit driving part are spaced apart from each other on a second side surface of the movable body, the first side and the second side disposed in opposite directions to each other.

4. The module of claim 3, wherein the image sensor is disposed between the first unit driving part and the second unit driving part when viewed in the first direction.

5. The module of claim 3, wherein the first unit driving part and the third unit driving part are arranged in the first direction, and the second unit driving part and the fourth unit driving part are arranged in the first direction.

6. The module of claim 1, wherein the movable body comprises a first side surface and a third side surface that extend in different directions from a corner of the movable body, and the driving unit comprises a first unit driving part and a fifth unit driving part disposed adjacent to a corner on the first side surface and the third side surface, respectively,
wherein the first unit driving part comprises a first driving coil of the driving coils and a first driving yoke of the driving yokes opposed in a first direction, perpendicular to the optical axis direction, and the fifth unit driving part comprises a fifth driving coil of the driving coils and a fifth driving yoke of the driving yokes opposed in a second direction, perpendicular to the optical axis direction, the first direction and the second direction intersecting each other.

7. The module of claim 1, wherein a surface of each of the driving yokes, respectively disposed opposite to each of the driving coils, is convex.

8. The module of claim 7, wherein the driving yokes and the driving coils are disposed opposite to each other in a first direction, perpendicular to the optical axis direction, and
a distance in the first direction from a central portion of at least one of the driving yokes to at least one of the driving coils is shorter than a distance in the first direction from a first end and a second end of the at least one of the driving yokes to the at least one driving coils.

9. The module of claim 1, wherein each of the driving yokes is a soft magnetic material.

10. The module of claim 1, wherein the driving unit further comprises a first yoke disposed on a first side of one of the driving coils, wherein the one of the driving coils is disposed between one of the driving yokes and the first yoke.

11. The module of claim 1, further comprising a substrate that mechanically connects the movable body to the fixed body, and is configured to deform based on a movement of the movable body with respect to the fixed body.

12. The module of claim 11, wherein the substrate comprises electric traces electrically connected to the image sensor.

13. The module of claim 12, wherein the substrate comprises a floating part fixedly coupled to the movable body, a fixed part fixedly coupled to the fixed body, and a support part that interconnects the floating part and the fixed part,
wherein the support part comprises a plurality of bridges that embed the electric traces therein.

14. The module of claim 13, wherein the support part comprises a guide disposed between the floating part and the fixed part, and is connected to the floating part and the fixed part through the plurality of bridges.

15. The module of claim 14, wherein the plurality of bridges comprise first bridges that extend in a first direction, perpendicular to the optical axis direction, from the floating part to the guide, and second bridges which extend from the guide to the fixed part in a second direction, perpendicular to the optical axis direction, the first direction and the second direction intersecting each other.

16. The module of claim 1, wherein the driving unit comprises a position sensor disposed on one of the fixed body and the movable body, and a sensing magnet disposed on another of the fixed body and the movable body and facing the position sensor in the optical axis direction.

17. A camera module, comprising:
a lens module comprising at least one lens; and
a sensor shifting module,
wherein the sensor shifting module comprises:
a fixed body;
a movable body movably disposed inside the fixed body, and including an image sensor oriented in an optical axis direction;
a substrate that mechanically connects the movable body to the fixed body, and is configured to deform based on a movement of the movable body with respect to the fixed body; and
a driving unit configured to move the movable body in a direction, perpendicular to the optical axis direction, with respect to the fixed body, and rotate the movable body about the optical axis direction,
wherein the driving unit comprises a driving coil coupled to one of the fixed body and the movable body, and a driving yoke coupled to the other one of the fixed body and the movable body, and
wherein parallel surfaces of the driving yoke and the driving coil face each other in a direction perpendicular to the optical axis direction, and a space between the driving yoke and the driving coil is an air gap, and
wherein a surface of the driving yoke, disposed opposite to the driving coil, comprises an inclined surface that extends from a central portion of the driving yoke to ends of the driving yoke.

18. The camera module of claim 17, wherein the driving yoke is a soft magnetic material.

19. The camera module of claim 17, wherein the driving unit comprises a first unit driving part, a second unit driving part, a third unit driving part and a fourth unit driving part, each comprising a driving coil and a driving yoke that are configured to move each of the first unit driving part, the second unit driving part, the third unit driving part, and the fourth unit driving part in a first direction, perpendicular to the optical axis direction, and respectively facing the first direction,
wherein the first unit driving part and the second unit driving part are spaced apart from each other on a first side surface of the movable body, and the third unit driving part and the fourth unit driving part are spaced apart from each other on a second side surface of the movable body, the first side surface and the second side surface being in opposite directions to each other.

* * * * *